United States Patent
Batthish et al.

(10) Patent No.: US 10,956,302 B2
(45) Date of Patent: Mar. 23, 2021

(54) CODE COVERAGE COLLECTION BASED ON LIMITED SELECT DEBUG INFORMATION

(71) Applicant: INTERNATIONAL BUSINESS MACHINES CORPORATION, Armonk, NY (US)

(72) Inventors: Violaine Batthish, Brampton (CA); Alan S. Boxall, Markham (CA); Thomas L. Ellis, Morgan Hill, CA (US); Trong Truong, Markham (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 145 days.

(21) Appl. No.: 16/164,978

(22) Filed: Oct. 19, 2018

(65) Prior Publication Data
US 2020/0125477 A1    Apr. 23, 2020

(51) Int. Cl.
*G06F 11/36*    (2006.01)

(52) U.S. Cl.
CPC ...... *G06F 11/3624* (2013.01); *G06F 11/3664* (2013.01)

(58) Field of Classification Search
None
See application file for complete search history.

(56) References Cited

U.S. PATENT DOCUMENTS

| | | | | |
|---|---|---|---|---|
| 8,291,384 B2* | 10/2012 | Takahashi | ........... | G06F 11/3676 717/124 |
| 8,776,025 B2* | 7/2014 | Wisniewski | ........ | G06F 11/3664 717/125 |
| 8,793,666 B2* | 7/2014 | Klinker | ................. | G06F 11/362 717/135 |
| 10,073,763 B1* | 9/2018 | Raman | ................ | G06F 11/3684 |
| 2015/0026660 A1* | 1/2015 | Vaidyanathan | .... | G06Q 10/0633 717/110 |
| 2018/0352386 A1* | 12/2018 | Gunasekara | ........... | H04B 17/29 |

OTHER PUBLICATIONS

Mubler, "Reducing the overhead of direct application instrumentation using prior static analysis" 2011, \Proc. of Europar 2011, (Year: 2011).*

(Continued)

*Primary Examiner* — Hossain M Morshed
(74) *Attorney, Agent, or Firm* — Noah Sharkan, Esq.; Kevin P. Radiqan, Esq.; Heslin Rothenberg Farley & Mesiti P.C.

(57) ABSTRACT

Selected information to be used for code coverage collection of an application is obtained. The selected information is a subset of debug information determined for the application and includes entry point offset information for entry points of the application. Using the entry point offset information, one or more traps are installed in the application. Code coverage collection is performed, in which a determination is made as to whether a trap has been reached. Based on the trap being reached, reach information is provided. The reach information is used to determine code being utilized in the application and for which one or more test cases are to be specifically targeted, rather than testing the application in its entirety, to reduce cycle time within the processor.

20 Claims, 7 Drawing Sheets

(56) References Cited

OTHER PUBLICATIONS

Intel-VTune, "Intel® VTune™ Profiler User Guide", 2020, Intel (Year: 2020).*
Chapter5, "Chapter 5. Setting Traps (Breakpoints)", 2012, http://csweb.cs.wfu.edu/~torgerse/Kokua/More_SGI/007-2579-009/sgi_html/ch05.html (Year: 2012).*
Mubler, "Reducing the overhead of direct application instrumentation using prior static analysis?", 2011, Published in \Proc. of Europar 2011, LNCS 6852 (Year: 2011).*
Tikir, "Efficient Instrumentation for Code Coverage Testing", 2002, ACM (Year: 2002).*
Mell, Peter and Tim Grance, "The NIST Definition of Cloud Computing," National Institute of Standards and Technology, Information Technology Laboratory, Special Publication 800-145, Sep. 2011, pp. 1-7.
IBM, "z/Architecture—Principles of Operation," IBM Publication No. SA22-7832-11, Twelfth Edition, Sep. 2017, pp. 1-1902.
Eager, Michael J., "Introduction to the DWARF Debugging Format," Feb. 2007, pp. 1-10.

* cited by examiner

CODE COVERAGE COLLECTION BASED ON LIMITED SELECT DEBUG INFORMATION

BACKGROUND

One or more aspects relate, in general, to processing within a computing environment, and in particular, to facilitating such processing to improve performance.

An aspect of processing within a computing environment includes determining what lines of computer code of applications executing within the computing environment are being accessed (referred to as hit) and how those lines are performing. To make this determination, testing is performed. However, testing of entire applications is costly and affects system performance. Therefore, targeted testing is desirable.

Targeted testing allows certain lines of code or certain sections of an application to be tested without necessarily testing the remaining lines of code or sections. As an example, if code has been changed, targeted testing is used to test just the changed code and not re-test the remaining code. The collection of information used to determine what is to be tested, however, is burdensome, particularly for very large and/or complex applications or computing environments.

SUMMARY

Shortcomings of the prior art are overcome and additional advantages are provided through the provision of a computer program product for facilitating processing within a computing environment. The computer program product includes a computer readable storage medium readable by a processor and storing instructions for performing a method. The method includes obtaining, by the processor, selected information to be used for code coverage collection of an application. The selected information is a subset of debug information determined for the application and includes entry point offset information for entry points of the application. Using the entry point offset information, a determination is made of one or more locations within the application to install one or more traps to be used for code coverage collection of the application. The one or more traps are installed at the determined one or more locations within the application. Code coverage collection is performed for the application, which includes: determining whether a trap of the one or more traps has been reached, and providing reach information, based on determining the trap has been reached. The reach information is used to determine code being utilized in the application and for which one or more test cases are to be specifically targeted at the code being utilized, rather than testing the application in its entirety, to reduce cycle time within the processor.

Computer-implemented methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

In accordance with an aspect of the present invention, a capability is provided to facilitate processing within a computing environment. In one or more aspects, processing is facilitated by using a minimum amount of information, such as a minimal amount of debug information, and minimal overhead to instrument and collect code coverage information of applications, including very large applications running in complex environments (e.g., multi-processor and/or multi-threaded environments). The code coverage information collected is used, in one example, to perform targeted testing of the application in which only the code being reached is tested.

Targeted testing enables organizations to shorten the development/test cycle and improve the speed of a continuous integration pipeline. It also improves processing within the computing environment by reducing the amount of testing, and therefore, processing cycles and memory used, improving system performance.

For large and complex applications, to apply efficient test selection, significant challenges in collecting test code coverage information is to be addressed. In accordance with an aspect of the present invention, selected debug information is used to determine where to install lightweight traps within an application for which code coverage is being determined. When a trap is hit, information is collected and used with the debug information to determine the code being reached and, therefore, to be targeted for testing. By using selected debug information, instead of loading and using the entire set of debug information to perform code coverage collection, memory is saved, processing cycles are reduced, and performance is improved.

Figure 1A:
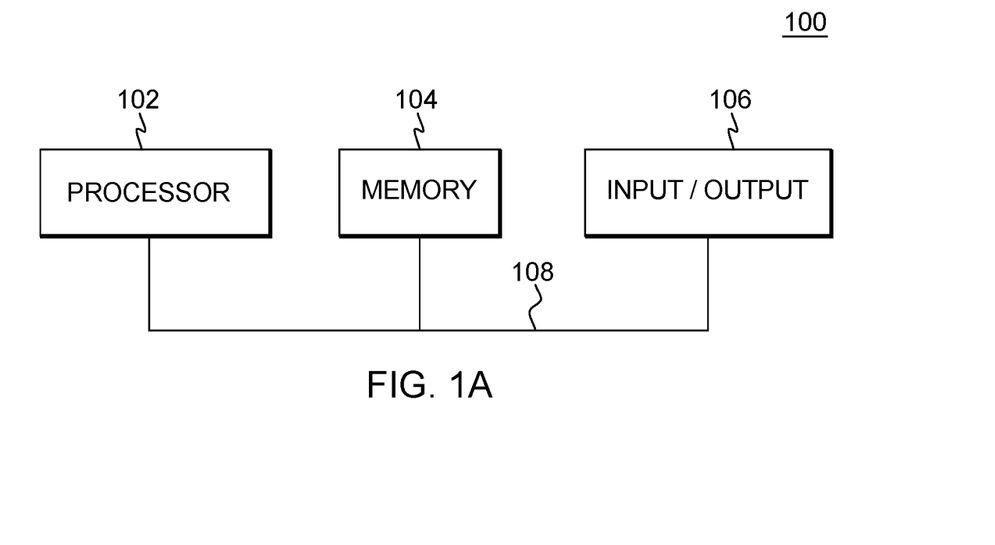
FIG. 1A depicts one example of a computing environment to incorporate and/or use one or more aspects of the present invention.

One embodiment of a computing environment to incorporate and use one or more aspects of the present invention is described with reference to FIG. 1A. A computing environment 100 includes, for instance, a processor 102 (e.g., a central processing unit), a memory 104 (e.g., main memory), and one or more input/output (I/O) devices and/or interfaces 106 coupled to one another via, for example, one or more buses 108 and/or other connections.

In one example, processor 102 is based on the z/Architecture hardware architecture offered by International Business Machines Corporation, and is part of a server, such as a System z® server, which is also offered by International Business Machines Corporation and implements the z/Architecture hardware architecture. One embodiment of the z/Architecture hardware architecture is described in a publication entitled, "z/Architecture Principles of Operation," IBM Publication No. SA22-7832-11, $12^{th}$ edition, September 2017, which is hereby incorporated herein by reference in its entirety. The z/Architecture hardware architecture, however, is only one example architecture; other architectures and/or other types of computing environments may include and/or use one or more aspects of the present invention. In one example, the processor executes an operating system, such as the z/OS® operating system, also offered by International Business Machines Corporation.

Figure 1B:
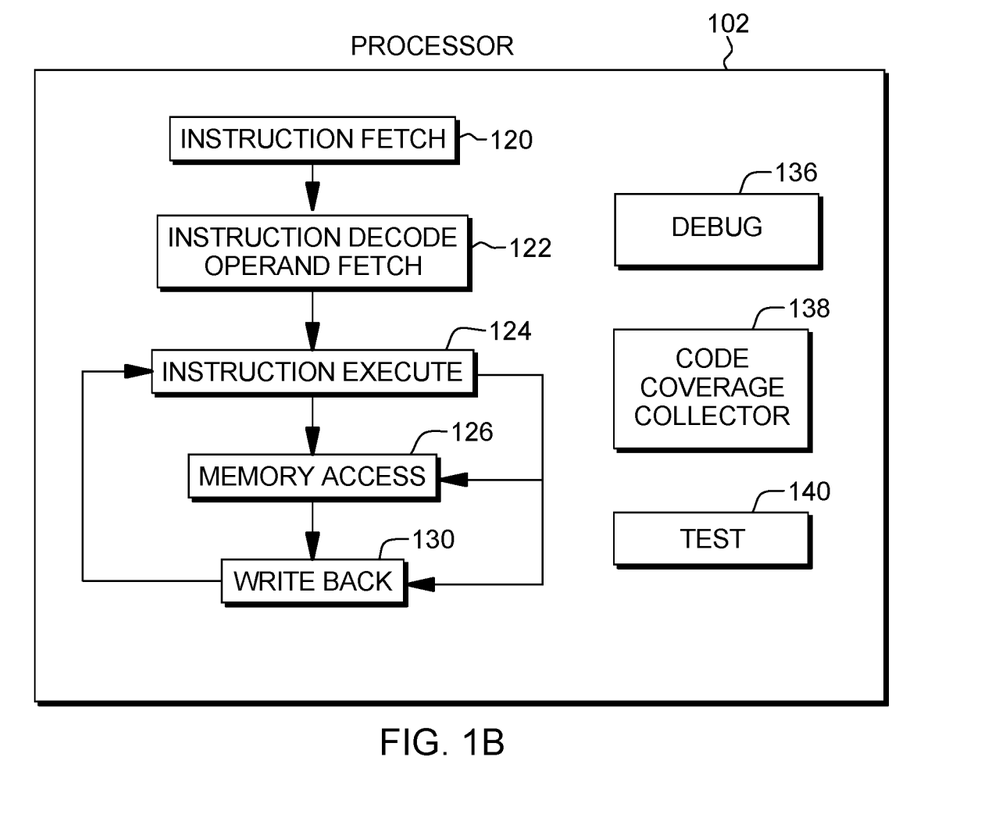
FIG. 1B depicts further details of a processor of the computing environment of FIG. 1A, in accordance with an aspect of the present invention.

Processor 102 includes a plurality of functional components used to execute instructions. As depicted in FIG. 1B, these functional components include, for instance, an instruction fetch component 120 to fetch instructions to be executed; an instruction decode unit 122 to decode the fetched instructions and to obtain operands of the decoded instructions; an instruction execute component 124 to execute the decoded instructions; a memory access component 126 to access memory for instruction execution, if necessary; and a write back component 130 to provide the results of the executed instructions. One or more of these components may, in accordance with one or more aspects of the present invention, include at least a portion of or have access to one or more other components that provide debug functionality, code coverage collector functionality and testing functionality. The one or more other components include, for instance, a debug component 136, a code coverage collector component 138, and a test component 140. In other examples, the functionality of one or more of components 136, 138 and 140 may be combined into one or more components. The functionality provided by components 136, 138 and 140 is described in further detail below.

Another example of a computing environment to incorporate and use one or more aspects of the present invention is described with reference to FIG. 2. In one example, the computing environment is based on the z/Architecture hardware architecture, however, the computing environment may be based on other architectures offered by International Business Machines Corporation or others.

Figure 2:
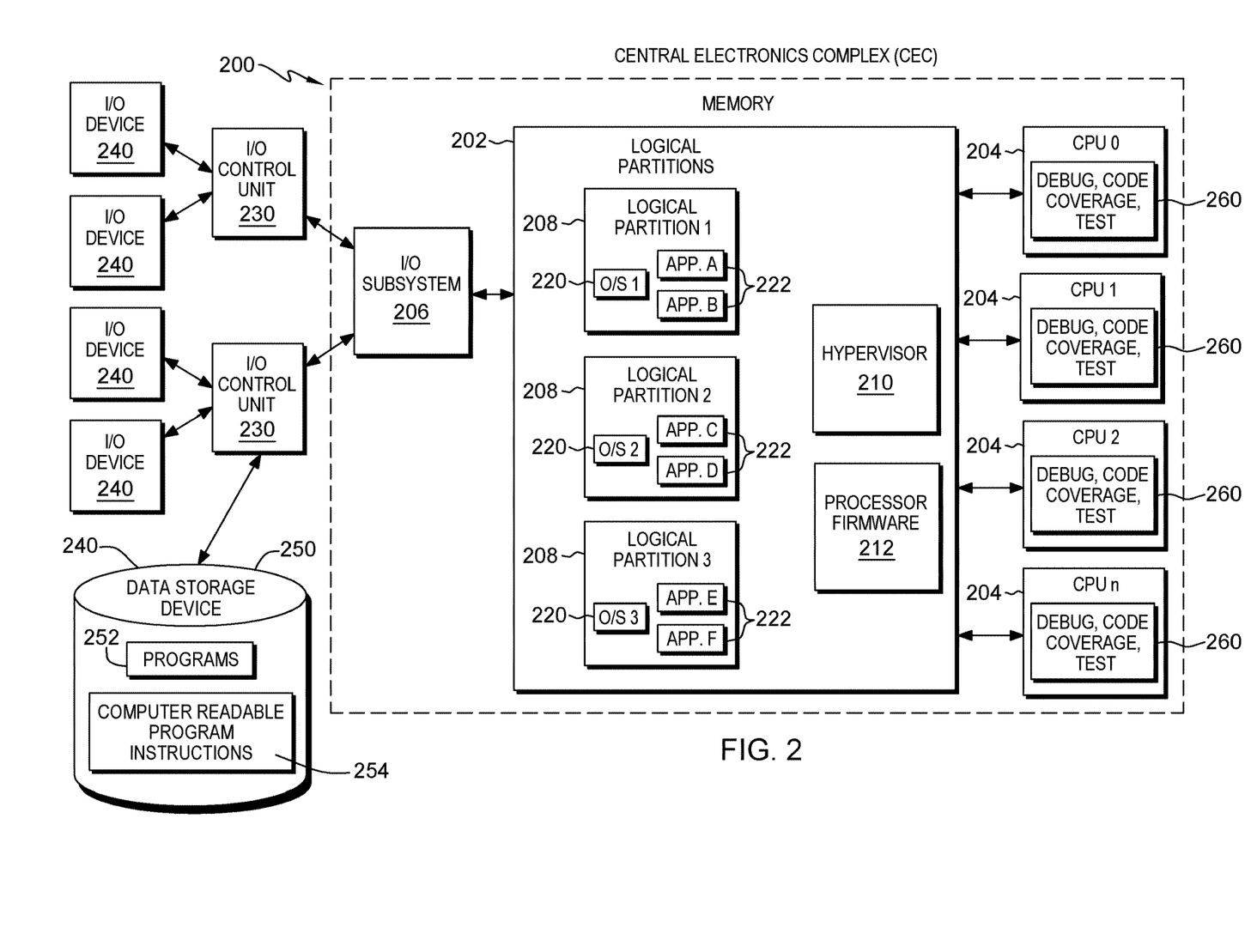
FIG. 2 depicts another embodiment of a computing environment to incorporate and/or use one or more aspects of the present invention.

Referring to FIG. 2, in one example, the computing environment includes a central electronics complex (CEC) 200. CEC 200 includes a plurality of components, such as, for instance, a memory 202 (a.k.a., system memory, main memory, main storage, central storage, storage) coupled to one or more processors (a.k.a., central processing units (CPUs)) 204, and to an input/output subsystem 206.

Memory 202 includes, for example, one or more logical partitions 208, a hypervisor 210 that manages the logical partitions, and processor firmware 212. One example of hypervisor 210 is the Processor Resource/System Manager (PR/SM™) hypervisor, offered by International Business Machines Corporation, Armonk, N.Y. As used herein, firmware includes, e.g., the microcode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

Each logical partition 208 is capable of functioning as a separate system. That is, each logical partition can be independently reset, run a guest operating system 220 such as a z/OS operating system, or another operating system, and operate with different programs 222. An operating system or application program running in a logical partition appears to have access to a full and complete system, but in reality, only a portion of it is available.

Memory 202 is coupled to processors (e.g., CPUs) 204, which are physical processor resources that may be allocated to the logical partitions. For instance, a logical partition 208 includes one or more logical processors, each of which represents all or a share of a physical processor resource 204 that may be dynamically allocated to the logical partition.

Further, memory 202 is coupled to I/O subsystem 206. I/O subsystem 206 may be a part of the central electronics complex or separate therefrom. It directs the flow of information between main storage 202 and input/output control units 230 and input/output (I/O) devices 240 coupled to the central electronics complex.

Many types of I/O devices may be used. One particular type is a data storage device 250. Data storage device 250 may store one or more programs 252, one or more computer readable program instructions 254, and/or data, etc. The computer readable program instructions may be configured to carry out functions of embodiments of aspects of the invention.

In one example, processor 204 includes one or more of a debug, code coverage collector and/or test component 260 to perform one or more of debug, code coverage collection and/or testing. In various examples, there may be one or more components performing these tasks.

Central electronics complex 200 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with central electronics complex 200. Examples include, but are not limited to: microcode, device drivers, redundant processing units, external disk drive arrays, RAID systems, tape drives, and data archival storage systems, etc.

Further, central electronics complex 200 may be operational with numerous other general purpose or special purpose computing system environments or configurations. Examples of well-known computing systems, environments, and/or configurations that may be suitable for use with central electronics complex 200 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Although various examples of computing environments are described herein, one or more aspects of the present invention may be used with many types of environments. The computing environments provided herein are only examples.

In accordance with one or more aspects of the present invention, limited select debug information is obtained (e.g., using a debug component, such as debug component 136 or component 260), and used to set traps within an application for which code coverage is to be determined. Code coverage collection is performed on the application to determine the code within the application being reached (a.k.a., hit, accessed, utilized). This information may be used to perform targeted testing of the code being reached. By using a minimal amount of debug information to determine where to install the traps within the application, installing the traps, and tracking the traps to determine where to test the code being reached, performance within the processor is improved. Less memory and processing cycles are used to determine the code to be tested, and the testing further uses less memory and processing cycles, since the testing is targeted to specific code. One or more aspects of the present invention provide highly optimized, low latency, low overhead code coverage collection and processing, improving processing within a computing environment.

One embodiment of processing associated with code coverage collection, in accordance with an aspect of the present invention, is described with reference to FIG. 3. This processing is performed by a processor, such as processor 102 or 204, and in particular, by one or more components within the processor, such as one or more of components 136, 138, 140 and/or 260.

Figure 3:
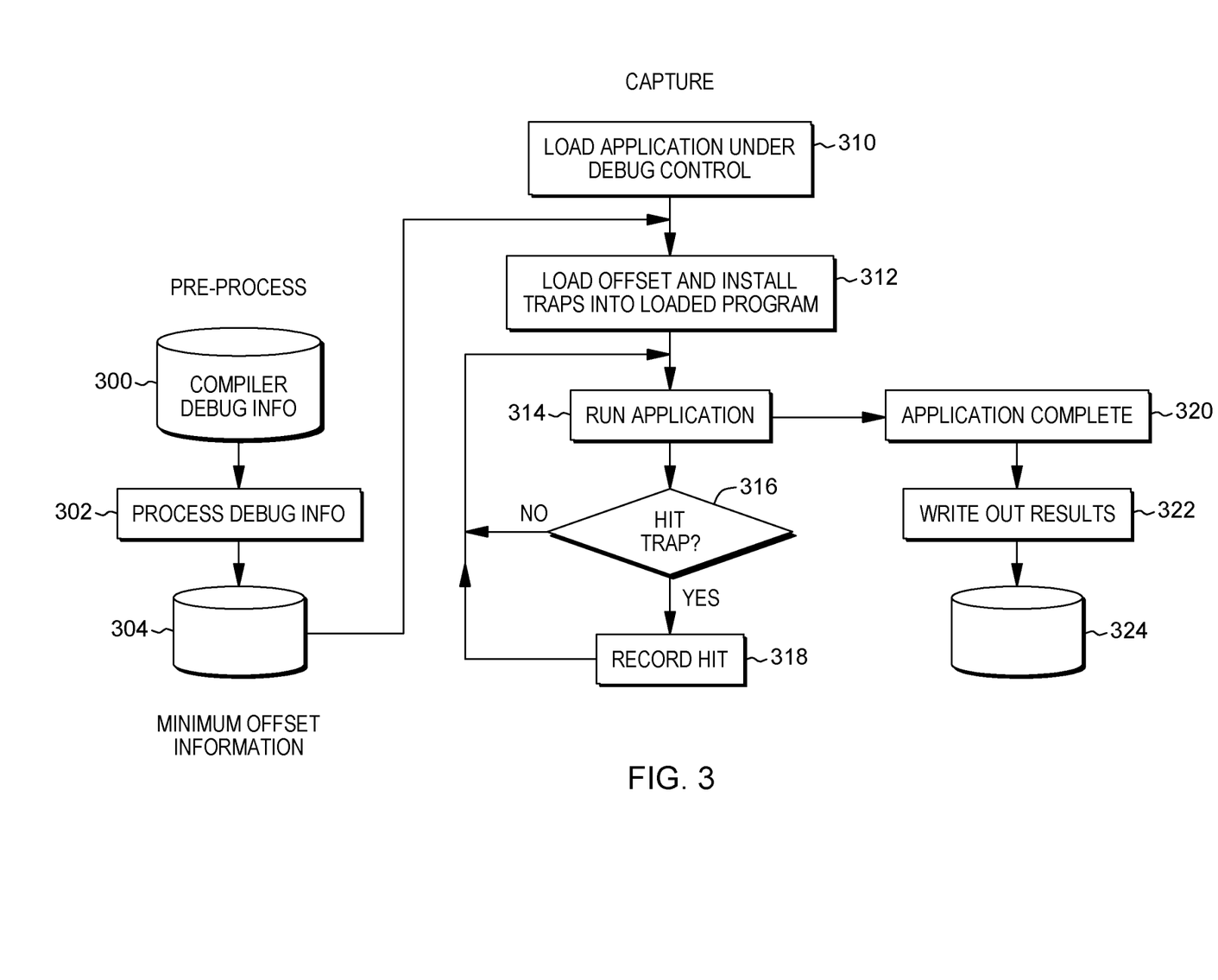
FIG. 3 depicts one example of processing associated with code coverage collection, in accordance with an aspect of the present invention.

Referring to FIG. 3, in one embodiment, initially, pre-processing is performed by, for instance, debug component 136 or 260 or another component of the processor, to obtain select information, such as select debug information, to be provided to the code coverage collector (e.g., component 138 or 260). The pre-processing includes, for instance, accessing one or more databases 300 of debug information obtained from previously debugging a chosen application. This debug information, which is typically a significant amount of information, particularly for very large and/or complex applications, is processed to select a minimal amount of the debug information, STEP 302. This processing of the debug information includes, for instance, searching the debug information for particular offset information, including offsets for procedures, functions, etc. of the application. In one particular example of the z/OS operating system, the information includes a csect name and within the csect, the name and offset of one or more procedures/functions. This extracted offset information is stored 304 (e.g., in one or more databases, tables or other data structures) for access by the code coverage collector (e.g., component 138 or component 260). In one example, it is performed prior to processing by the code coverage collector and asynchronous thereto.

Subsequently, based on a determination to perform code coverage collection for the application, the code coverage collector (e.g., component 138 or 260) or another component of the processor loads the application to be examined, STEP 310. In one example, it is loaded under debug control to be able to place traps within the application. The code coverage collector determines, using stored information 304, one or more locations within the application to install traps, STEP 312.

In one example, a trap is stored at each offset (of, e.g., a procedure or function) identified within the selected debug information. A trap is, for instance, lightweight in comparison to a breakpoint, in that it is has a static, particular definition and does not have changing attributes or properties. For instance, there is one type of trap, but a number of breakpoint types, such as entry, exit, line, statement, exceptional, on load, etc. A breakpoint has an enable/disable state (when disabled, they behave like they are not installed, but they still exist); however, a trap is installed or not installed. A breakpoint keeps track of how many times it has been hit before alerting the user; however, a trap stops the program until it is removed. Breakpoints are conditional in that they can stop only when a condition is true. This might include when a variable has a certain value. In contrast, traps are unconditional. They stop every time until they are removed. Breakpoints can have an attached action or set of commands to be executed when hit, but a trap only stops and there is no associated action. By using traps instead of breakpoints, processing within the processor is facilitated by eliminating certain checks and processing, which, at the very least simplifies the processing, reduces processing cycles to be used and reduces the amount of memory used.

Subsequent to installing the traps in the locations based on the selected debug information, the application is run, STEP 314, and a determination is made as to whether a trap has been reached, INQUIRY 316. If a trap has been reached, information regarding the trap is recorded, such as the address of the function reached, etc., STEP 318. Thereafter or if a trap has not been reached, processing continues to STEP 314.

The application runs until it is complete (or in another embodiment, until code coverage collection is terminated), STEP 320. Based on completing code coverage collection, the results of the run are written out to a storage device 324 or memory, STEP 322. As examples, the results (e.g., indication of hit and/or not hit) are written to tables, databases and/or other data structures. Further, in one example, the results are cross-referenced with the previously obtained debug information to produce code coverage. For instance, the traps that were hit/not hit, as indicated by the results, are combined with the previously obtained debug information to map hit/not hit information to the source of the application to obtain the names of the procedures/functions that were hit. For example, for each hit trap, an offset of the trap is obtained by subtracting an address of the start of the executable (e.g., procedure/function) from the address of the trap, and this offset is used to locate an entry in a table of traps that includes the names of the functions/procedures. Other mapping techniques may also be used. The results of this processing may also be stored in one or more tables, databases and/or other data structures of storage device 324 or memory.

The recorded information is then used, in one example, for targeted testing, as described with reference to FIG. 4. The processing of FIG. 4 is performed, in one example, by a processor, and in particular, by a component of the processor, such as test component 140 or component 260.

Figure 4:
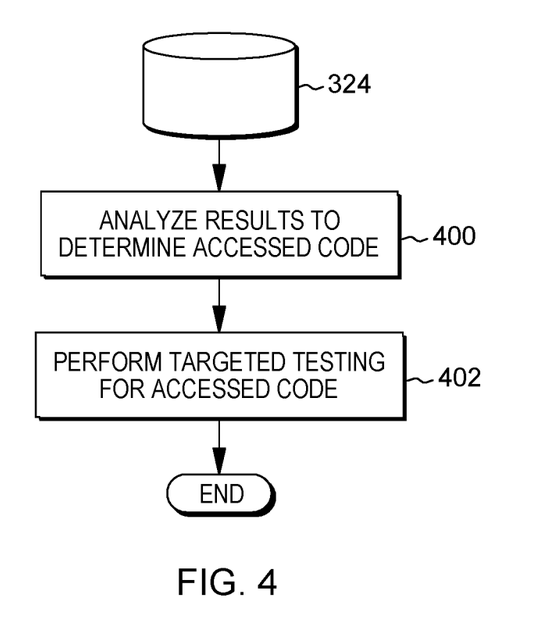
FIG. 4 depicts one example of using code coverage collection information in facilitating processing within a computing environment, including targeted testing, in accordance with an aspect of the present invention.

Referring to FIG. 4, in one example, test component 140 or 260 or another component of the processor analyzes stored results 324 to determine the code within the application that has been accessed (i.e., reached, hit), STEP 400. For instance, the stored results indicate for each offset whether there has been a hit for that offset. If an offset has been hit, it is an indication, in one example, that the code associated with that offset is to be tested. Based on the analysis, targeted testing is performed, STEP 402. The targeted testing includes, for instance, using test component 140 or 260 or another component of the processor to perform one or more tests against the code that has been hit. Since the testing is targeted, performance within the processor is improved, since less processing cycles and memory are used. The processor itself is improved.

By using a minimal amount of debug offset information as input to determine where to place the traps, the amount of debug information used for code coverage (CC) collection is reduced by orders of magnitude. Examples are provided below:

1. Regular Debug Info: 2,923,625 bytes
CC Optimized Debug Info: 2,030 bytes
1000 times reduction
2. Regular Debug Info: 6,007,760 bytes
CC Optimized Debug Info: 12,308 bytes
488 times reduction Thus, debug technology is leveraged with a new type of debug information that is optimized for code coverage (CODI: Code Coverage Optimized Debug Information), particularly for very large applications. Using function/procedure level coverage as the granularity for data collection, the amount of debug information used to determine code coverage is reduced by orders of magnitude. The size reduction has a direct implication for scalability, as the smaller footprint translates to less I/O in loading the debug information at execution time, less memory consumption, and faster performance.

In one particular example, a large application may have 2000 programs/source files with an average of 1000 statements, each with an average of 5 entries/routines/functions per program/source. Thus, there may be 2,000,000 statements and 10,000 entries/procedures/routines/functions entry points (a subset of the statements).

For debug, each statement has an entry in a statement table, which has information about the statement number and the offset. For some debuggers, such as a Source Level Debugger (SLD), an entry in the statement table is, for instance, 40 bytes. In the case of the large application when using SLD:

The amount of storage used with only the procedure/routine/function entry statement information is: 10,000*40=400,000 bytes=390K The amount of storage used when all statements are used: 2,000,000*40=80,000,000 bytes=78,125K.

The amount of storage saved is the number of statements where the information is not needed: 2,000,000−10,000=1,900,00 multiplied by the size of a statement table entry: 1,900,000*40=76,000,000 bytes=74,218K.

The average number of statements in a procedure/routine/function affects the benefit.

In one or more aspects, as part of a build process (not during runtime), debug information is generated for applications to be analyzed for code coverage. For large applications, this debug information can range, for instance, from several hundred megabytes to gigabytes in size. The debug information is examined, and in one embodiment, only the addresses for the procedures/functions are extracted into a separate file (e.g., CODI). The separate file, which includes just the addresses and number of the procedures/functions, is several orders of magnitude smaller than the original debug information. This smaller size has a direct impact on the scalability and performance of the code coverage collection at runtime, improving memory usage, I/O speed, and overall performance.

The code coverage collector reads the CODI file and sets traps on the procedures/functions. After the traps are set, a resume is executed to start the program running. Upon hitting a trap, associated logic is executed that records the occurrence of the trap (and in one embodiment, the frequency of occurrence). This is recorded, for instance, in a log file that will be post-processed after execution. Upon detecting that the application being run has completed, the log file may, in one example, be converted to a code coverage format. For instance, the offsets hit are mapped back to the source to determine the names of the procedures/functions to be targeted for testing.

One or more aspects of the present invention are inextricably tied to computer technology and facilitate processing within a computer, improving performance thereof. By determining code coverage, certain processes may be performed, including, for instance, targeted testing of certain portions of the code determined to be accessed by the code coverage collector. This facilitates testing, as well as other processing within the computing environment. Improvements to processing are provided, since less information is loaded and examined, increasing efficiencies within the computing environment.

Aspects of the present invention may be used by many types of computing environments. Another embodiment of a computing environment to incorporate and use one or more aspects of the present invention is described with reference to FIG. 5A. In this example, a computing environment 500 includes, for instance, a native central processing unit (CPU) 502, a memory 504, and one or more input/output devices and/or interfaces 506 coupled to one another via, for example, one or more buses 508 and/or other connections. As examples, computing environment 500 may include a PowerPC® processor offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel Corporation, Oracle, or others. IBM, z/Architecture, System z, z/OS, PR/SM and PowerPC are trademarks or registered trademarks of International Business Machines Corporation in at least one jurisdiction. Intel and Itanium are trademarks or registered trademarks of Intel Corporation or its subsidiaries in the United States and other countries.

Figure 5A:
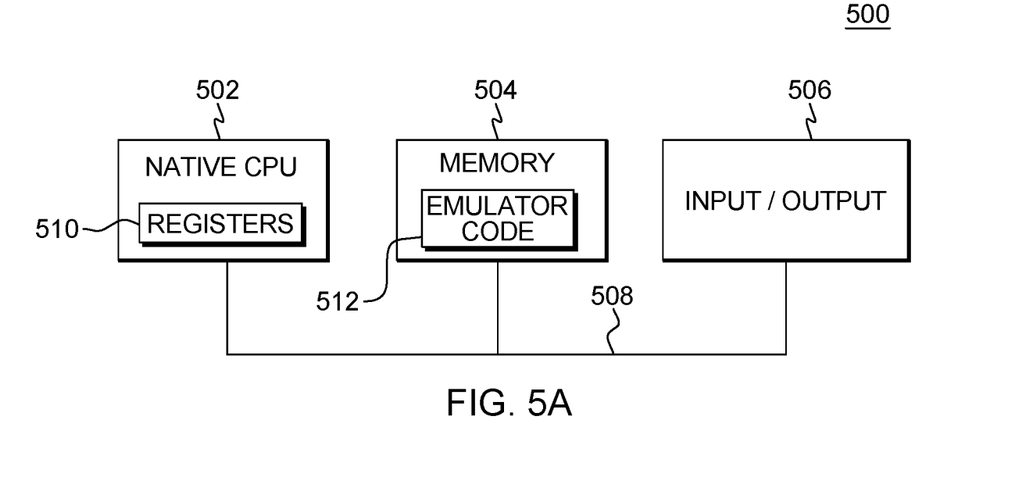
FIG. 5A depicts yet a further embodiment of a computing environment to incorporate and/or use one or more aspects of the present invention.

Native central processing unit 502 includes one or more native registers 510, such as one or more general purpose registers and/or one or more special purpose registers used during processing within the environment. These registers include information that represents the state of the environment at any particular point in time.

Moreover, native central processing unit 502 executes instructions and code that are stored in memory 504. In one particular example, the central processing unit executes emulator code 512 stored in memory 504. This code enables the computing environment configured in one architecture to emulate another architecture. For instance, emulator code 512 allows machines based on architectures other than the z/Architecture hardware architecture, such as PowerPC processors, HP Superdome servers or others, to emulate the z/Architecture hardware architecture and to execute software and instructions developed based on the z/Architecture hardware architecture.

Figure 5B:
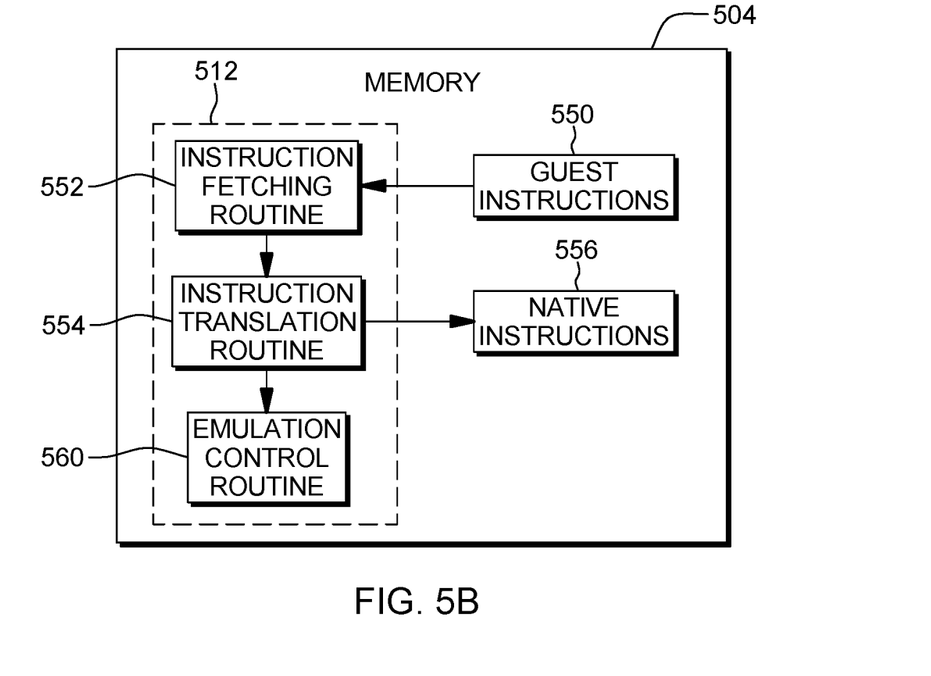
FIG. 5B depicts further details of the memory of the computing environment of FIG. 5A, in accordance with an aspect of the present invention.

Further details relating to emulator code 512 are described with reference to FIG. 5B. Guest instructions 550 stored in memory 504 comprise software instructions (e.g., correlating to machine instructions) that were developed to be executed in an architecture other than that of native CPU 502. For example, guest instructions 550 may have been designed to execute on a processor 102 based on the z/Architecture hardware architecture, but instead, are being emulated on native CPU 502, which may be, for example, an Intel Itanium II processor. In one example, emulator code 512 includes an instruction fetching routine 552 to obtain one or more guest instructions 550 from memory 504, and to optionally provide local buffering for the instructions obtained. It also includes an instruction translation routine 554 to determine the type of guest instruction that has been obtained and to translate the guest instruction into one or more corresponding native instructions 556. This translation includes, for instance, identifying the function to be performed by the guest instruction and choosing the native instruction(s) to perform that function.

Further, emulator code 512 includes an emulation control routine 560 to cause the native instructions to be executed. Emulation control routine 560 may cause native CPU 502 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 556 may include loading data into a register from memory 504; storing data back to memory from a register; or performing some type of arithmetic or logic operation, as determined by the translation routine.

Each routine is, for instance, implemented in software, which is stored in memory and executed by native central processing unit 502. In other examples, one or more of the routines or operations are implemented in firmware, hardware, software or some combination thereof. The registers of the emulated processor may be emulated using registers 510 of the native CPU or by using locations in memory 504. In embodiments, guest instructions 550, native instructions 556 and emulator code 512 may reside in the same memory or may be disbursed among different memory devices.

The computing environments described above are only examples of computing environments that can be used. Other environments, including but not limited to, other non-partitioned environments, other partitioned environments, and/or other emulated environments, may be used; embodiments are not limited to any one environment.

Each computing environment is capable of being configured to include one or more aspects of the present invention. For instance, each may be configured to provide debugging, code coverage collection, and/or testing capabilities, in accordance with one or more aspects of the present invention.

One or more aspects of the present invention are inextricably tied to computer technology and facilitate processing within a computer, improving performance thereof.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 6:
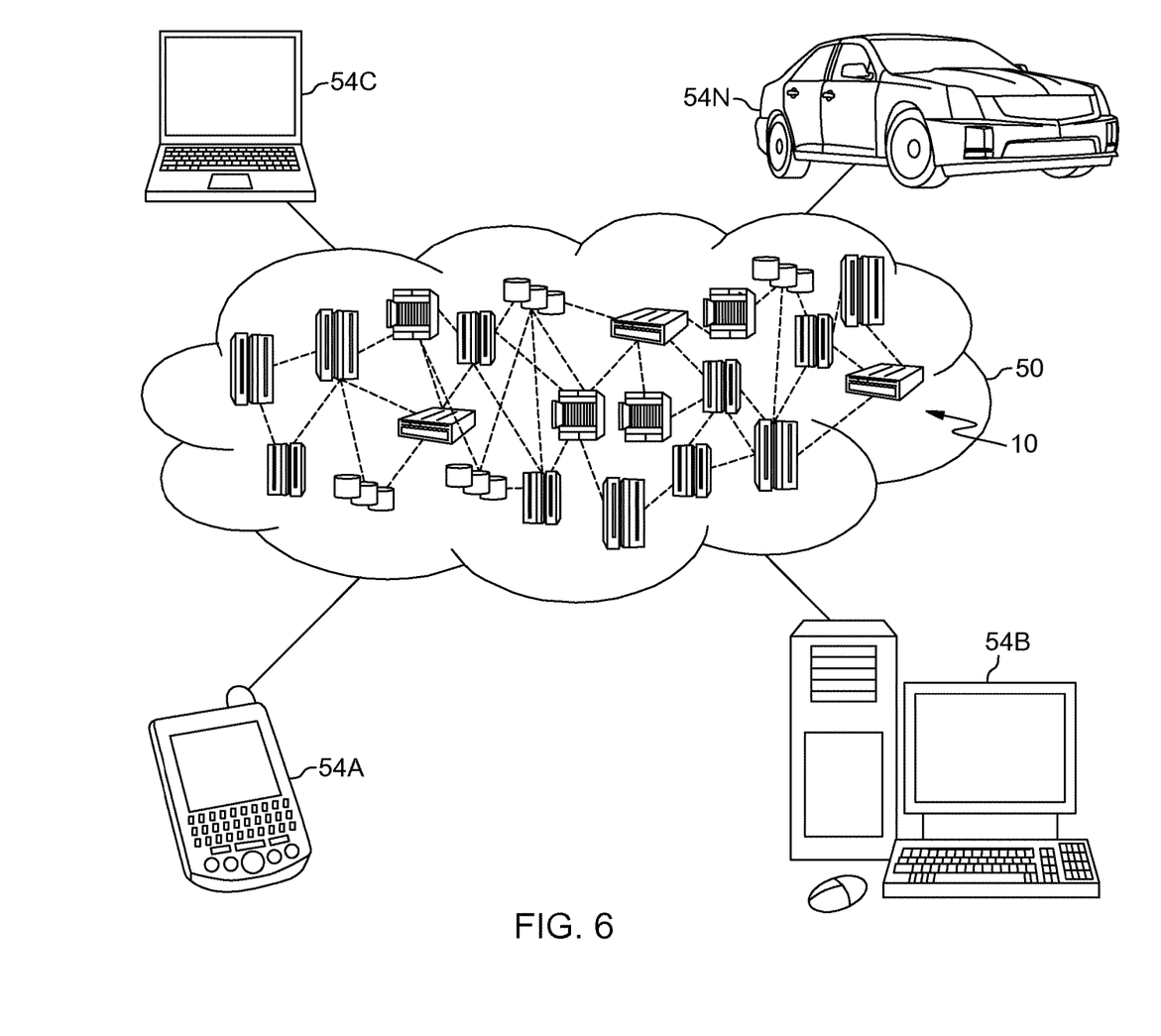
FIG. 6 depicts one embodiment of a cloud computing environment.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
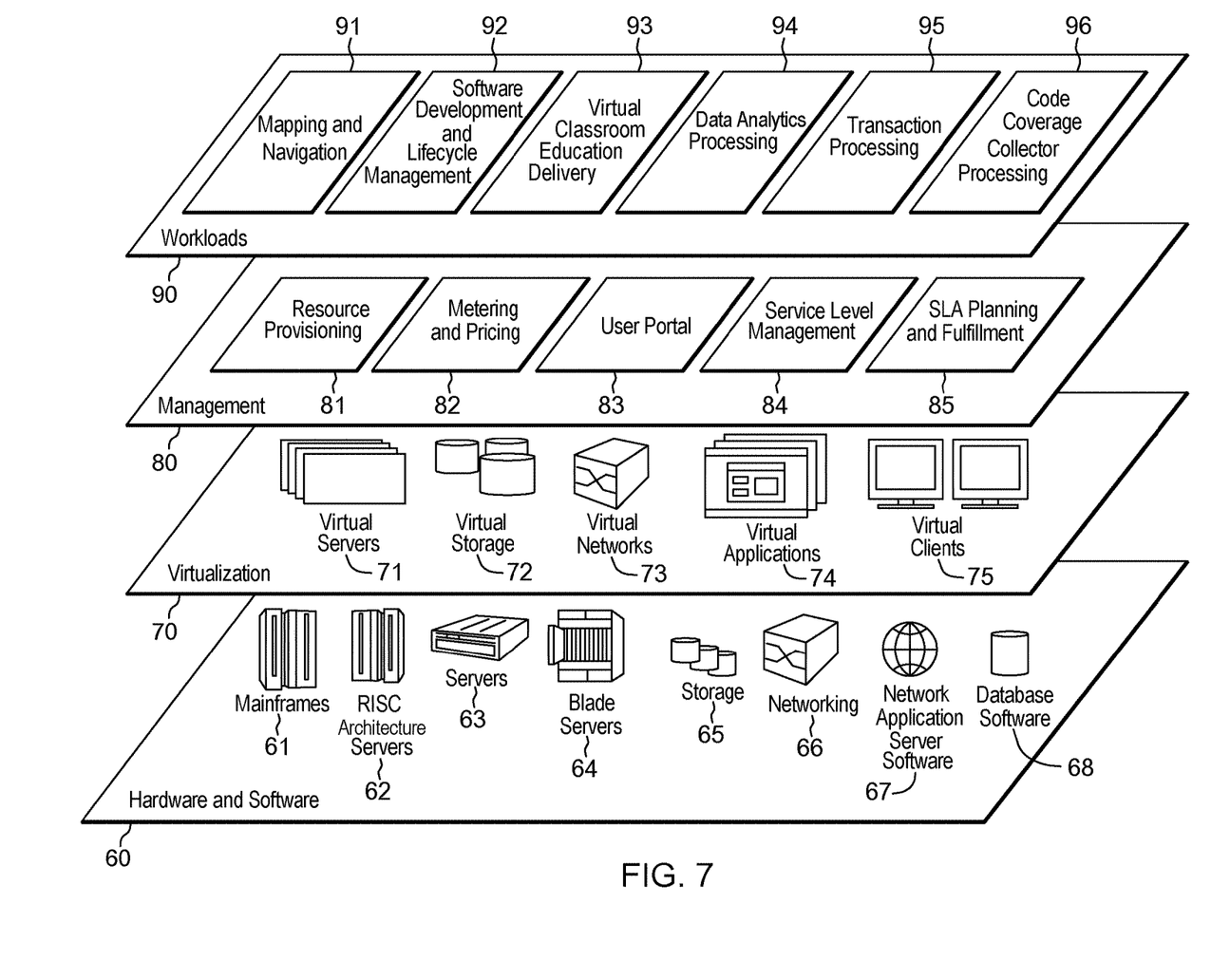
FIG. 7 depicts one example of abstraction model layers.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and code coverage collector processing 96 (including debug processing, code coverage collector processing and/or testing processing).

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different debug information may be selected and used for code coverage collection. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:
    a computer readable storage medium readable by a processor and storing instructions for performing a method comprising:
        accessing, by the processor, debug information obtained from previously debugging an application;
        processing, by the processor, the debug information to select a subset of debug information for the application, the processing including searching the debug information for particular offset information, and saving the particular offset information as a debug information subset for use by code coverage collector processing, the selected debug information subset including entry point offset information for particular entry points of the application;
        determining whether to perform code coverage collection for the application;
        based on determining to perform code coverage collection for the application, loading the application;
        determining, using the entry point offset information of the selected debug information subset, one or more locations within the loaded application to install one or more traps to be used for the code coverage collection of the application, where a trap of the one or more traps stops running of the application until it is removed from the application;
        installing the one or more traps at the determined one or more locations within the application;
        performing code coverage collection for the application, wherein the performing code coverage collection includes:
            running the application;
            stopping the running of the application upon determining that the trap of the one or more traps has been reached; and
            providing reach information, based on determining the trap has been reached; and
        using the reach information to determine code being utilized in the application and for which one or more test cases are to be specifically targeted, rather than testing the application in its entirety, to reduce cycle time within the processor.

2. The computer program product of claim 1, wherein the performing code coverage collection occurs subsequent and asynchronous to the processing of the debug information and the saving of the particular offset information as the debug information subset for use by the code coverage collection processing, and wherein the performing code coverage collection includes repeating the determining the trap has been reached, and the providing reach information, based on determining the trap has been reached for one or more other traps, until a predefined termination point is reached.

3. The computer program product of claim 2, wherein the predefined termination point comprises an end of the application.

4. The computer program product of claim 1, wherein the using the reach information to determine code being utilized includes combining the reach information with the debug information to determine where in the application the traps were reached.

5. The computer program product of claim 1, wherein the trap is an unconditional stop, and based on reaching the trap, the application is stopped, the trap is removed, and the application is resumed.

6. The computer program product of claim 1, wherein the reach information includes an offset in the application.

7. The computer program product of claim 1, wherein the method further comprises executing one or more tests against the code determined to be utilized.

8. The computer program product of claim 1, wherein the particular offset information includes a CSECT name of a CSECT instruction, and from within the CSECT instruction, a name and offset of one or more procedures.

9. The computer program product of claim 1, wherein the trap has a static, particular definition absent changing attributes or properties.

10. A computer system for facilitating processing within a computing environment, the computer system comprising:
    a memory; and
    a processor in communication with the memory, wherein the computer system is configured to perform a method, said method comprising:
        accessing, by the processor, debug information obtained from previously debugging an application;
        processing, by the processor, the debug information to select a subset of debug information for the application, the processing including searching the debug information for particular offset information, and saving the particular offset information as a debug information subset for use by code coverage collector processing, the selected debug information subset including entry point offset information for particular entry points of the application;
        determining whether to perform code coverage collection for the application;
        based on determining to perform code coverage collection for the application, loading the application;
        determining, using the entry point offset information of the selected debug information subset, one or more locations within the loaded application to install one or more traps to be used for the code coverage collection of the application, where a trap of the one or more traps stops running of the application until it is removed from the application;

installing the one or more traps at the determined one or more locations within the application;

performing code coverage collection for the application, wherein the performing code coverage collection includes:

running the application;

stopping the running of the application upon determining that the trap of the one or more traps has been reached; and providing reach information, based on determining the trap has been reached; and using the reach information to determine code being utilized in the application and for which one or more test cases are to be specifically targeted, rather than testing the application in its entirety, to reduce cycle time within the processor.

11. The computer system of claim 10, wherein the performing code coverage collection occurs subsequent and asynchronous to the processing of the debug information and the saving of the particular offset information as the debug information subset for use by the code coverage collection processing, and wherein the performing code coverage collection includes repeating the determining the trap has been reached, and the providing reach information, based on determining the trap has been reached for one or more other traps, until a predefined termination point is reached.

12. The computer system of claim 10, wherein the trap is an unconditional stop, and based on reaching the trap, the application is stopped, the trap is removed, and the application is resumed.

13. The computer system of claim 10, wherein the reach information includes an offset in the application.

14. The computer system of claim 10, wherein the method further comprises executing one or more tests against the code determined to be utilized, and the particular offset information includes a CSECT name of a CSECT instruction, and from within the CSECT instruction, a name and offset of one or more procedures.

15. The computer system of claim 10, wherein the trap has a static, particular definition absent changing attributes or properties.

16. A computer-implemented method of facilitating processing within a computing environment, the computer-implemented method comprising:

accessing, by the processor, debug information obtained from previously debugging an application;

processing, by the processor, the debug information to select a subset of debug information for the application, the processing including searching the debug information for particular offset information, and saving the particular offset information as a debug information subset for use by code coverage collector processing, the selected debug information subset including entry point offset information for particular entry points of the application;

determining whether to perform code coverage collection for the application;

based on determining to perform code coverage collection for the application, loading the application;

determining, using the entry point offset information of the selected debug information subset, one or more locations within the loaded application to install one or more traps to be used for the code coverage collection of the application, where a trap of the one or more traps stops running of the application until it is removed from the application;

installing the one or more traps at the determined one or more locations within the application;

performing code coverage collection for the application, wherein the performing code coverage collection includes:

running the application;

stopping the running of the application upon determining that the trap of the one or more traps has been reached; and providing reach information, based on determining the trap has been reached; and using the reach information to determine code being utilized in the application and for which one or more test cases are to be specifically targeted, rather than testing the application in its entirety, to reduce cycle time within the processor.

17. The computer-implemented method of claim 16, wherein the performing code coverage collection occurs subsequent and asynchronous to the processing of the debug information and the saving of the particular offset information as the debug information subset for use by the code coverage collection processing, and wherein the performing code coverage collection includes repeating the determining the trap has been reached, and the providing reach information, based on determining the trap has been reached for one or more other traps, until a predefined termination point is reached.

18. The computer-implemented method of claim 16, wherein the trap is an unconditional stop, and based on reaching the trap, the application is stopped, the trap is removed, and the application is resumed.

19. The computer-implemented method of claim 16, wherein the method further comprises executing one or more tests against the code determined to be utilized, and the particular offset information includes a CSECT name of a CSECT instruction, and from within the CSECT instruction, a name and offset of one or more procedures.

20. The computer-implemented method of claim 16, wherein the trap has a static, particular definition absent changing attributes or properties.

* * * * *